(12) United States Patent
Shioiri et al.

(10) Patent No.: US 11,796,439 B2
(45) Date of Patent: Oct. 24, 2023

(54) UNIFORMITY OUTPUT DEVICE, UNIFORMITY OUTPUT METHOD, AND NON-TRANSITORY COMPUTER-READABLE RECORDING MEDIUM FOR DETERMINING WHETHER A PARTICLE DIAMETER OF PARTICLES IN A MIXTURE IS UNIFORM OR NON-UNIFORM

(71) Applicants: HIOKI E.E. CORPORATION, Ueda (JP); National Institute of Advanced Industrial Science and Technology, Tokyo (JP)

(72) Inventors: Akihiro Shioiri, Ueda (JP); Naoto Nakayama, Ueda (JP); Yuki Kawamuro, Ueda (JP); Masahiro Horibe, Tsukuba (JP)

(73) Assignees: HIOKI E.E. CORPORATION, Ueda (JP); NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 264 days.

(21) Appl. No.: 17/155,705

(22) Filed: Jan. 22, 2021

(65) Prior Publication Data

US 2021/0231549 A1    Jul. 29, 2021

(30) Foreign Application Priority Data

Jan. 23, 2020    (JP) .................................. 2020-009421

(51) Int. Cl.
*G01N 15/02*    (2006.01)

(52) U.S. Cl.
CPC .............................. *G01N 15/0266* (2013.01)

(58) Field of Classification Search
CPC .......... G01N 2015/0053; G01N 27/02; G01N 15/02; G01N 2015/0277; G01N 27/06;
(Continued)

(56) References Cited

U.S. PATENT DOCUMENTS 6,710,874 B2 * 3/2004 Mavliev ............. G01N 15/1459
356/336
7,182,553 B2 * 2/2007 Takagi ................... B01J 8/0015
406/197

(Continued)

FOREIGN PATENT DOCUMENTS

JP            2013167485     *  8/2013

OTHER PUBLICATIONS

"Determination of particle size distribution by gravitational liquid sedimentation methods—Part 1: General principles and guidelines," Japanese Industrial Standards No. JIS Z8820-1:2002, Jul. 20, 2002, 16 pages including English explanation, Japanese Standards Association, Japan.

(Continued)

*Primary Examiner* — Vinh P Nguyen
(74) *Attorney, Agent, or Firm* — Jordan IP Law, LLC (57) ABSTRACT

A uniformity output device for outputting a uniformity of particles in a slurry, in which an insoluble solid matter is mixed in liquid, includes: a pair of electrodes configured to apply AC voltage to the slurry; a measurement unit configured to measure impedance of the slurry on the basis of the response current flowing through the slurry when AC voltage with changing frequency is applied to the slurry; and a processing unit configured to determine the uniformity by executing a particle equivalent circuit analysis with a parallel circuit formed of a resistor and a capacitor as an element on the basis of the impedance measured by the measurement unit in accordance with the frequency.

9 Claims, 9 Drawing Sheets

(58) Field of Classification Search
CPC .... G01N 15/0266; G01N 15/04; G01R 27/08;
G01R 27/02; G01R 31/389; G06F
18/217; G06F 11/3409
See application file for complete search history.

(56) References Cited

U.S. PATENT DOCUMENTS

| | | | |
|---|---|---|---|
| 8,395,398 B2 * | 3/2013 | Xu | G01N 15/1218 |
| | | | 702/29 |
| 11,525,794 B2 * | 12/2022 | Nakayama | G01R 27/08 |
| 2022/0042897 A1 * | 2/2022 | Kawamuro | G01N 15/04 |

OTHER PUBLICATIONS

"Determination of particle size distribution by centrifugal liquid sedimentation methods—Part 1: General principles and guidelines," Japanese Industrial Standards No. JIS Z8823-1:2001, Apr. 20, 2001, 12 pages including English explanation, Japanese Standards Association, Japan.

* cited by examiner

UNIFORMITY OUTPUT DEVICE, UNIFORMITY OUTPUT METHOD, AND NON-TRANSITORY COMPUTER-READABLE RECORDING MEDIUM FOR DETERMINING WHETHER A PARTICLE DIAMETER OF PARTICLES IN A MIXTURE IS UNIFORM OR NON-UNIFORM

CROSS-REFERENCE TO RELATED APPLICATION

The present application claims priority 35 U.S.C. § 119 to Japanese Patent Application No. 2020-009421 (filed on Jan. 23, 2020), which is hereby incorporated by reference in its entirety.

TECHNICAL FIELD

The present invention relates to a uniformity output device, a uniformity output method, and a non-transitory computer-readable recording medium.

BACKGROUND ART

Uniformity of a particle diameter, dispersion of particles, or the like is used as an evaluation index of a slurry that is a type of mixture in which particles of an insoluble solid matter are mixed in liquid.

A method for measuring the uniformity of the particle diameter of the particles contained in the slurry includes a sedimentation method. Furthermore, the sedimentation method includes a gravitational liquid sedimentation method (Japan Industrial Standard "JIS Z8820-1:2002") that utilizes the natural gravity and a centrifugal liquid sedimentation method (Japan Industrial Standard "JIS Z8823-1:2001") that utilizes the centrifugal force.

In a sedimentation test according to the above-described sedimentation method, for a state such as the uniformity of the particle diameter of the particles contained in the slurry, the dispersion of the slurry, and so forth, an observation of a change in a height of a boundary between a supernatant liquid layer and a particle layer, which is formed by sedimentation over an elapsed time, an observation of a clarity/turbidity state of the supernatant liquid layer, and so forth is performed by a measurer after the slurry is charged into a sedimentation tube.

SUMMARY OF INVENTION

However, with the above-described sedimentation method, it takes long time until the sedimentation of the particles in the slurry is stabilized. With the centrifugal sedimentation method, although the time period required is reduced, a certain amount of waiting time is still required. In addition, in recent years, there are increasing demands for higher-functionality and higher-performance for electronic components, etc. that are manufactured from the slurry as a starting material. Therefore, there are demands to strictly manage the state of the slurry that is the starting material.

However, because the sedimentation test described above is not only time consuming, but also its measurement result involves subjectivity of the measurer, there has been a possibility for an improvement in terms of the measurement time and an accuracy.

The present invention has been conceived in light of the above-described problem, and an object thereof is to provide a uniformity output device, a uniformity output method, and a non-transitory computer-readable recording medium capable of accurately determining a uniformity of a particle diameter of particles contained in a mixture in a short period of time.

According to one aspect of the present invention, provided is a uniformity output device configured to output a uniformity of a particle diameter of particles in a mixture in which an insoluble solid matter is mixed in liquid, the uniformity output device comprising: an electrode configured to apply AC signal to the mixture; measurement unit configured to measure impedance of the mixture based on a response signal flowing through the mixture when the AC signal with changing frequency is applied to the mixture; and processing unit configured to determine the uniformity by executing a particle equivalent circuit analysis with a parallel circuit formed of a resistor and a capacitor as an element based on the impedance measured by the measurement unit in accordance with the frequency.

According to another aspect of the present invention, provided is a uniformity output method configured to output a uniformity of a particle diameter of particles in a mixture in which an insoluble solid matter is mixed in liquid, the uniformity output method comprising: a step of applying AC signal with changing frequency to the mixture and a step of measuring impedance of the mixture based on a response signal flowing through the mixture when the AC signal with changing frequency is applied to the mixture; and a step of determining the uniformity by executing a particle equivalent circuit analysis with a parallel circuit formed of a resistor and a capacitor as an element based on the impedance measured in accordance with the frequency.

According to another aspect of the present invention, provided is a non-transitory computer-readable recording medium including a program configured to cause a computer to output a uniformity of a particle diameter of particles in a mixture in which an insoluble solid matter is mixed in liquid, the program causing the computer to execute: a step of applying AC signal with changing frequency to the mixture and a step of measuring impedance of the mixture based on a response signal flowing through the mixture when the AC signal with changing frequency is applied to the mixture; and a step of determining the uniformity based on a reference Nyquist diagram by executing a particle equivalent circuit analysis with a parallel circuit formed of a resistor and a capacitor as an element based on the impedance measured in accordance with the frequency.

According to an aspect of the present invention, it is possible to accurately determine a uniformity of a particle diameter of particles contained in a mixture in a short period of time.

DESCRIPTION OF EMBODIMENTS

In the following, this embodiment will be described with reference to the attached drawings. In this description, the same reference signs are given to the same components throughout the description.

(Uniformity Output Device)

A uniformity output device 1 according to this embodiment will be described first with reference to FIGS. 1 and 2.

Figure 1:
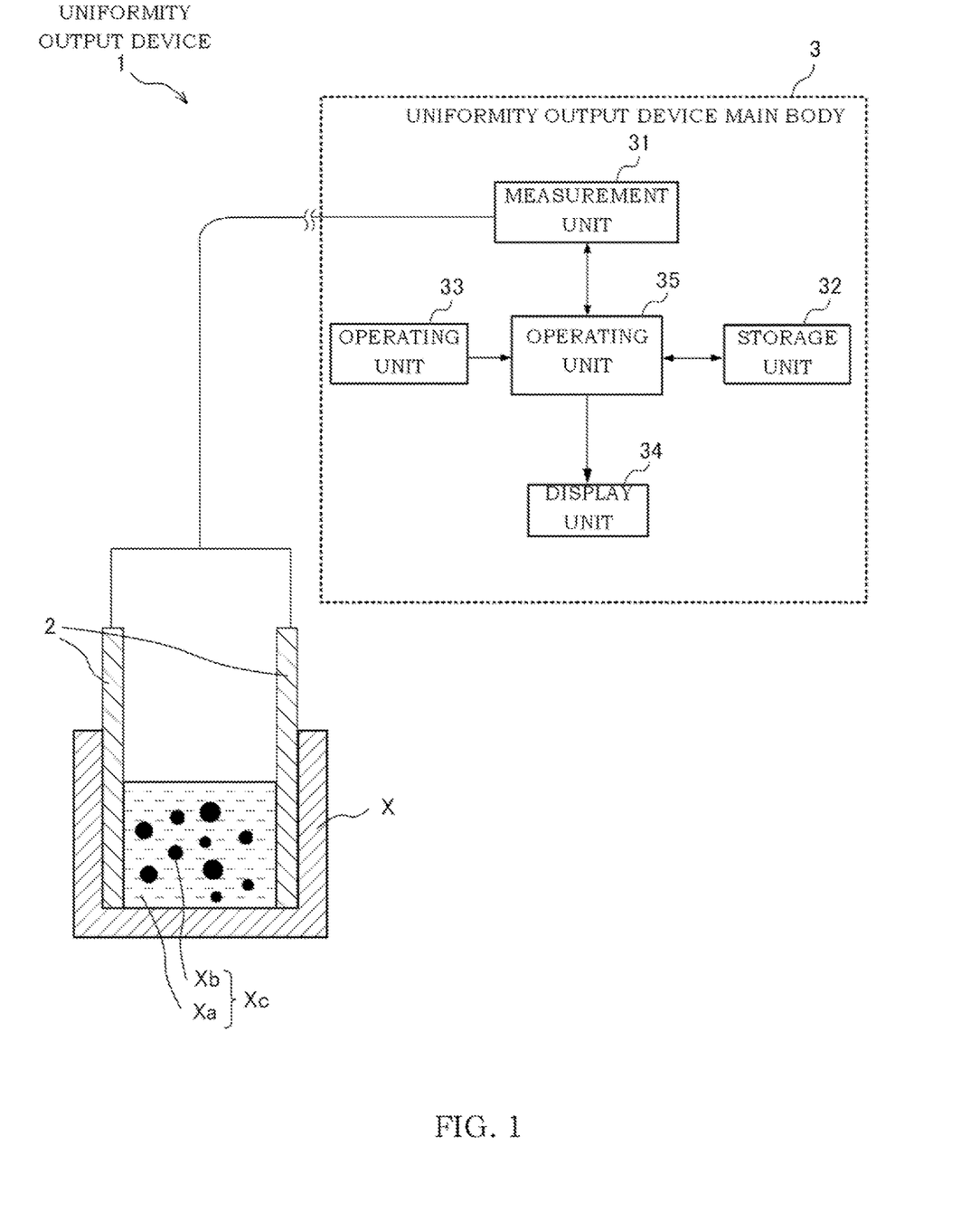
FIG. 1 is a schematic view showing a uniformity output device according to this embodiment.

FIG. 1 is a schematic view showing the uniformity output device 1 according to this embodiment. FIG. 2 is a block diagram showing a functional configuration of a processing unit 35 in a uniformity output device main body 3.

As shown in FIG. 1, the uniformity output device 1 is a device for outputting a uniformity of a particle diameter of particles in a slurry Xc serving as a mixture that is stored in a tank X and that is formed by mixing an insoluble solid matter Xb in liquid Xa. The uniformity output device 1 is provided with electrodes 2 and the uniformity output device main body 3. An example of the slurry Xc includes those in which electrically conductive particles such as carbon black, etc. serving as the solid matter Xb with high electrical conductivity are dispersed in a solvent (an organic solvent containing a binder resin and an active material) serving as the liquid Xa with low electrical conductivity.

As shown in FIG. 1, for example, the electrodes 2 apply AC voltage serving as an AC signal to the slurry Xc stored in the tank X. In this embodiment, the electrodes 2 are formed of a pair of the electrodes 2 that are provided on a peripheral wall of the tank X so as to face with each other; however, the configuration thereof is not limited thereto, and for example, the electrodes 2 may be configured of a plurality of electrodes 2. The AC signal to be applied to the slurry Xc is not limited to the AC voltage, and the AC signal may be AC current.

The uniformity output device main body 3 includes a measurement unit 31 serving as measurement means, a storage unit 32 serving as a storage medium, an operating unit 33 serving as operating means, a display unit 34 serving as display means, and the processing unit 35 serving as processing means. The measurement unit 31, the storage unit 32, the operating unit 33, and the display unit 34 may be configured so as not to be included in the uniformity output device main body 3.

The measurement unit 31 measures impedance of the slurry Xc on the basis of response current serving as a response signal that flows through the slurry Xc when the AC voltage whose frequency is being changed is applied to the slurry Xc located between the pair of electrodes 2. The AC voltage is applied to the pair of electrodes 2 in such a manner that the frequency of the AC voltage is changed stepwise. The AC voltage applied to the pair of electrodes 2 is supplied from a constant-voltage power supply (CV) or a constant-current power supply (CC) that is built into the measurement unit 31. The measurement unit 31 measures the impedance of the slurry Xc on the basis of the response current flowing between the pair of electrodes 2 every time the frequency of the AC voltage is changed stepwise and outputs it to the processing unit 35 as a measurement signal.

The storage unit 32 is formed of a RAM and a ROM. A program for executing a uniformity output processing for outputting the uniformity of the particle diameter of the particles in the slurry Xc and a predetermined approximation degree threshold, which will be described later, are stored in the storage unit 32. In other words, the storage unit 32 is a computer-readable storage medium in which an operation program for the processing unit 35 is recorded. The storage unit 32 may also be configured so as to be integral with the processing unit 35.

The operating unit 33 is provided with various operation switches for instructing the start of the uniformity output processing, etc. The operating unit 33 outputs operation signals adapted to these operations to the processing unit 35. Instead of the operation switch, the operating unit 33 may be configured with a touch operating unit provided on the upper surface of the display unit 34.

The display unit 34 displays a determination result, etc. in accordance with the instruction from the processing unit 35. The display unit 34 is formed of a liquid crystal panel, etc.

On the basis of the impedance measured by the measurement unit 31 in accordance with the frequency of the AC voltage, the processing unit 35 determines the uniformity of the particle diameter of the particles in the slurry Xc by executing an equivalent circuit analysis by using an equivalent circuit including a parallel circuit RC1 that is formed of a resistor R1 and a capacitor C1 (see FIG. 7A) as an element. The uniformity in this context refers to an index indicating a degree of uniformness of the size of the particle diameter of the particles in the slurry Xc. As the size of the particle diameter of the particles in the slurry Xc approaches the uniform state, the uniformity is increased, and the size of the particle diameter approaches the nonuniform state, the uniformity is decreased. In the following, the execution of the equivalent circuit analysis using the equivalent circuit including the parallel circuit RC1 as the element is referred to as "a particle equivalent circuit analysis".

The processing unit 35 is formed of a CPU as a computer. The processing unit 35 may also be formed of a plurality of microcomputers.

Figure 2:
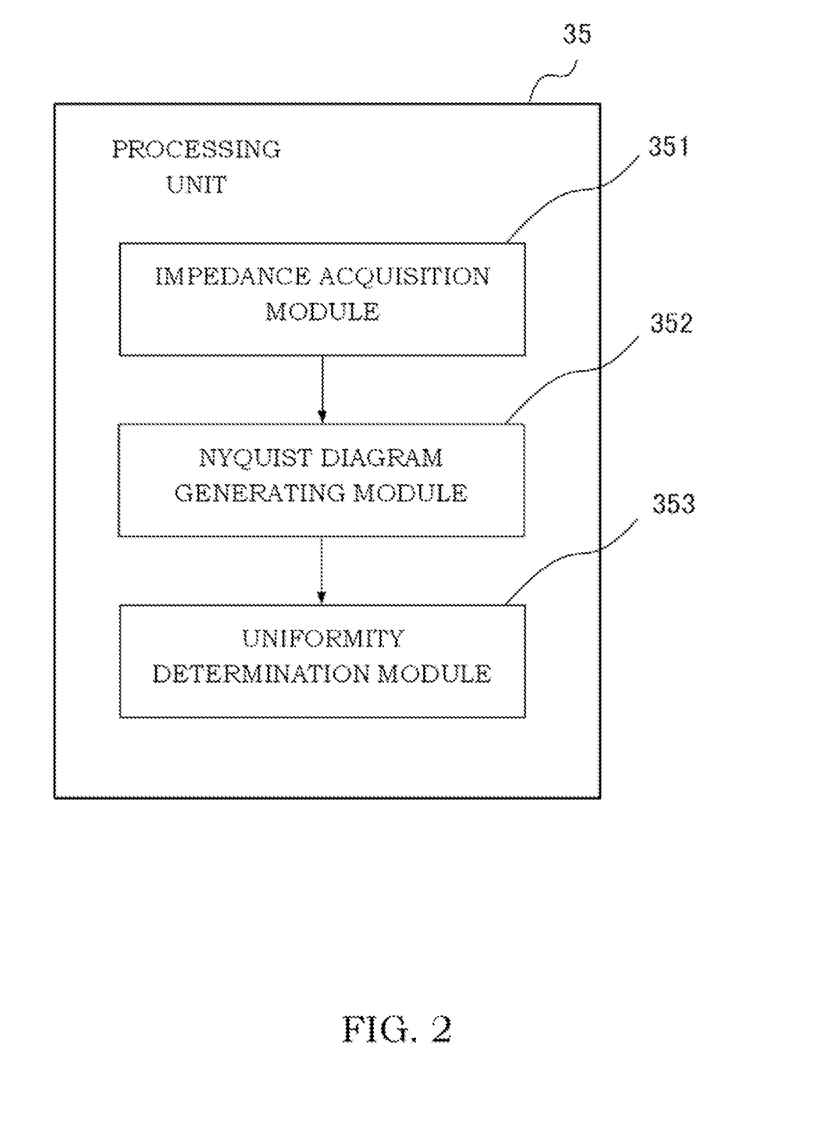
FIG. 2 is a block diagram showing a functional configuration of a processing unit of the uniformity output device main body.

As shown in FIG. 2, the processing unit 35 has an impedance acquisition module 351, a Nyquist diagram generating module 352, and a uniformity determination module 353.

The impedance acquisition module 351 acquires the impedance output from the measurement unit 31 and outputs the acquired impedance to the Nyquist diagram generating module 352.

The Nyquist diagram generating module 352 generates a measured Nyquist diagram M (see FIG. 5) on the basis of a plurality of impedance output from the impedance acquisition module 351. The Nyquist diagram generating module 352 then outputs the generated measured Nyquist diagram M to the uniformity determination module 353.

The uniformity determination module 353 executes the particle equivalent circuit analysis with the parallel circuit RC1 formed of the resistor R1 and the capacitor C1 (see FIG. 7A) as the element on the basis of the measured Nyquist diagram M (see FIG. 5) output from the Nyquist diagram generating module 352, thereby determining the uniformity of the particle diameter of the particles in the slurry Xc. The uniformity determination module 353 then outputs the determined uniformity to the display unit 34.

(Uniformity Output Processing)

Next, the uniformity output processing for outputting the uniformity of the particle diameter of the particles in the slurry Xc will be described with reference to FIG. 3.

Figure 3:
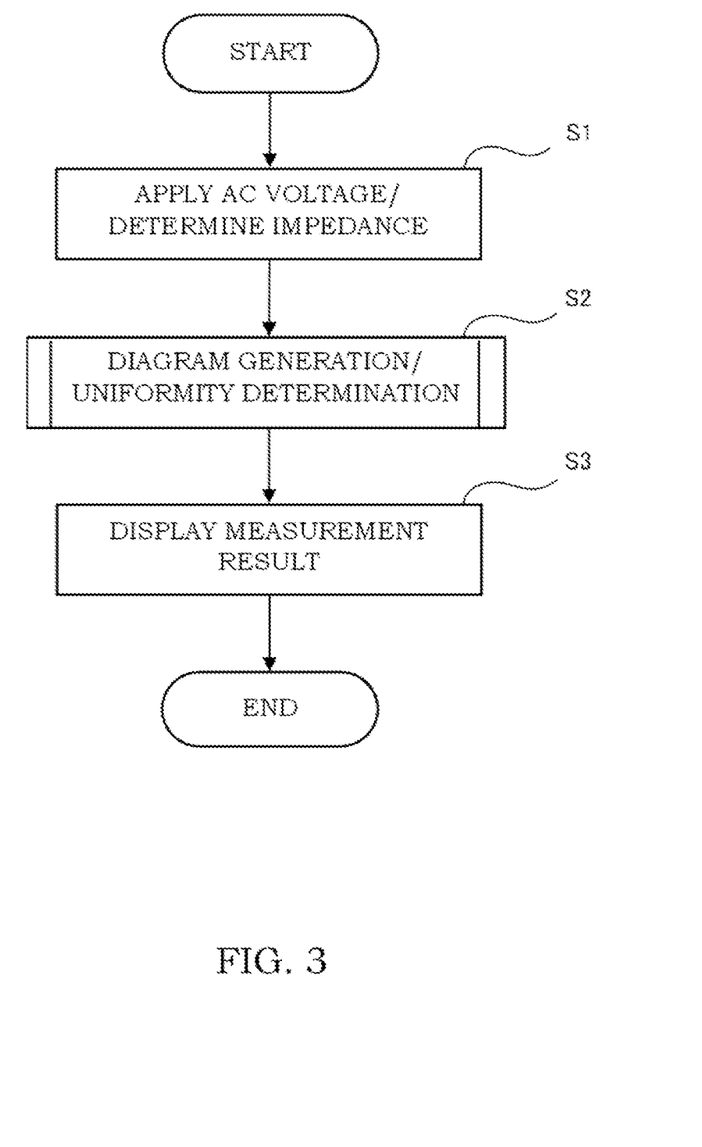
FIG. 3 is a flowchart showing a uniformity output processing executed by the uniformity output device.

FIG. 3 is a flowchart showing the uniformity output processing executed by the uniformity output device 1.

As the uniformity output processing is started by operation on the operating unit 33 by a user, the processing proceeds to Step S1.

In Step S1, the measurement unit 31 measures the impedance of the slurry Xc on the basis of the response current flowing through the slurry Xc when the AC voltage is applied to the slurry Xc in accordance with the instruction from the processing unit 35. The measurement unit 31 then outputs the measured impedance to the processing unit 35, and the processing proceeds to Step S2.

Specifically, in Step S1, the measurement unit 31 applies the AC voltage to the pair of electrodes 2 in such a manner that the frequency is changed stepwise in accordance with the instruction from the processing unit 35 and determines the impedance of the slurry Xc from the response current between the pair of electrodes 2 every time the frequency of the AC voltage is changed stepwise. The measurement unit 31 then outputs the measured impedance to the processing unit 35.

Next, in Step S2, the processing unit 35 generates a reference Nyquist diagram M0 (see FIG. 7B) by executing the particle equivalent circuit analysis with the parallel circuit RC1 (see FIG. 7A) as the element on the basis of the impedance output from the measurement unit 31 and calculates the uniformity of the particle diameter of the particles in the slurry Xc on the basis of the reference Nyquist diagram M0.

By doing so, compared with the sedimentation test that takes a long time and in which the subjectivity of the measurer is involved in the measurement result, it is possible to accurately determine the uniformity of the particle diameter of the particles in the slurry Xc in a short period of time. The processing unit 35 then outputs the determined uniformity to the display unit 34, and the processing proceeds to Step S3. A detail of a diagram-generation/uniformity-determination processing (Step S2) will be described later.

Next, in Step S3, the display unit 34 displays the determination result, etc. that is output from the processing unit 35 as an output result in accordance with the instruction from the processing unit 35. The processing unit 35 then terminates the uniformity output processing.

(Diagram-Generation/Uniformity-Determination Processing)

Next, the diagram-generation/uniformity-determination processing (Step S2) in the uniformity output processing will be described with reference to FIGS. 4 and 5.

Figure 4:
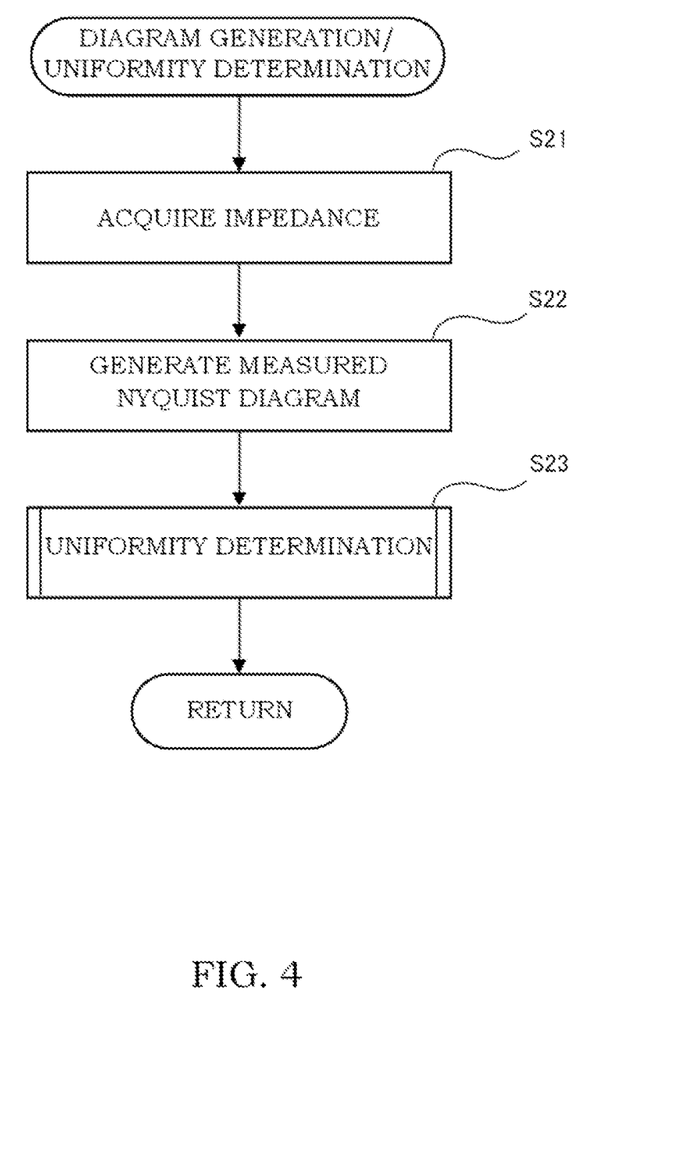
FIG. 4 is a flowchart showing a diagram-generation/uniformity-determination processing in the uniformity output processing.

FIG. 4 is a flowchart showing the diagram-generation/uniformity-determination processing (Step S2) in the uniformity output processing. FIG. 5 is the measured Nyquist diagram M that is acquired on the basis of the measured impedance of the slurry Xc.

As shown in FIG. 4, in Step S21, the impedance acquisition module 351 of the processing unit 35 shown in FIG. 2 acquires the impedance output from the measurement unit 31. The impedance acquisition module 351 then outputs the acquired impedance to the Nyquist diagram generating module 352, and the processing proceeds to Step S22.

Next, in Step S22, the Nyquist diagram generating module 352 of the processing unit 35 acquires the measured Nyquist diagram M (see FIG. 5) on the basis of the plurality of impedance that is output from the impedance acquisition module 351. The Nyquist diagram generating module 352 then outputs the generated measured Nyquist diagram M to the uniformity determination module 353, and the processing proceeds to Step S23.

Specifically, in Step S22, the Nyquist diagram generating module 352 plots data of the impedance on a complex plane on the basis of the plurality of impedance measured by the measurement unit 31 in accordance with the frequency of the AC voltage and acquires the measured Nyquist diagram M (see FIG. 5) along the plotted data of the impedance. The Nyquist diagram generating module 352 then outputs the generated measured Nyquist diagram M to the uniformity determination module 353.

Figure 5:
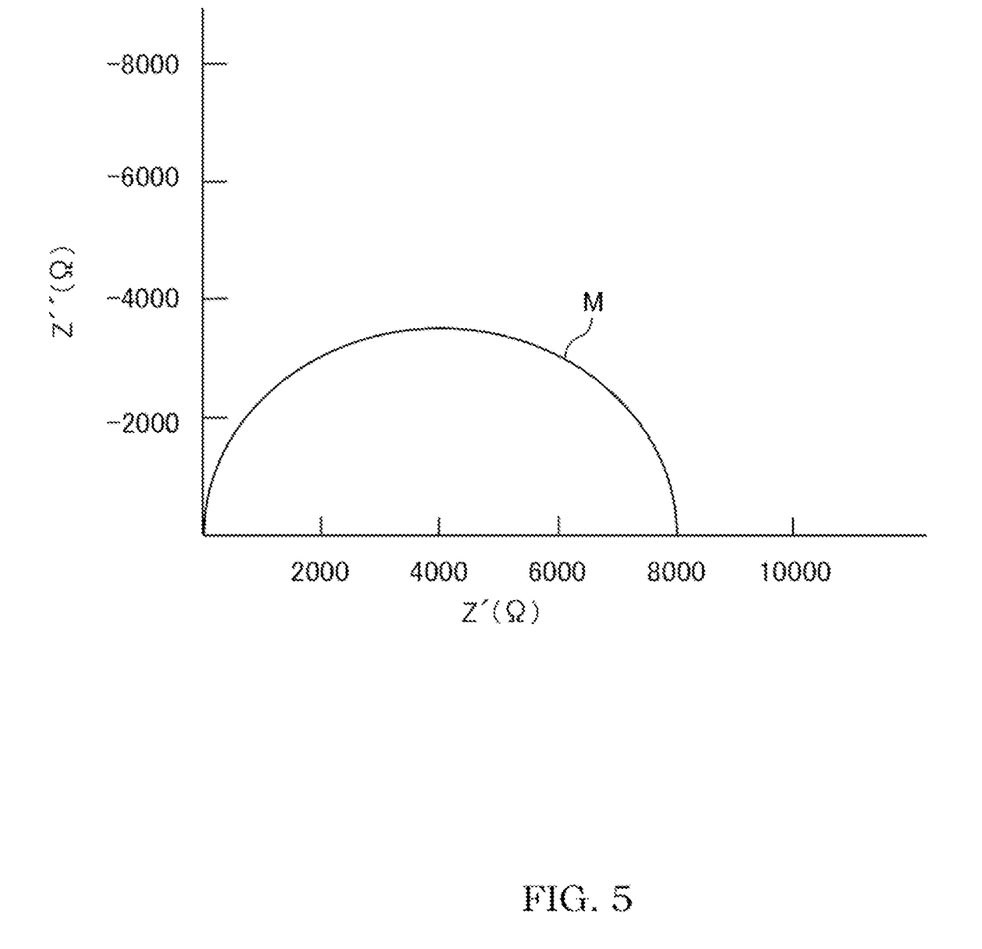
FIG. 5 is a measured Nyquist diagram that is acquired on the basis of impedance.

In the above, the measured Nyquist diagram M shown in FIG. 5 shows, on the complex plane, a real number component (R1) of the impedance on a horizontal axis (Z') and an imaginary number component of the impedance on a vertical-axis (Z''). In addition, the measured Nyquist diagram M shown in FIG. 5 shows a semi-ellipse (a semicircle that is flattened in the vertical-axis direction) extending along the horizontal axis (Z').

Next, referring back to FIG. 4, in Step S23, the uniformity determination module 353 of the processing unit 35 generates the reference Nyquist diagram M0 (see FIG. 7B) by executing the particle equivalent circuit analysis with the parallel circuit RC1 (see FIG. 7A) as the element on the basis of the measured Nyquist diagram M output from the Nyquist diagram generating module 352 and determines the uniformity of the particle diameter of the particles in the slurry Xc on the basis of the reference Nyquist diagram M0. The uniformity determination module 353 then outputs the determined uniformity to the display unit 34 and terminates the diagram-generation/uniformity-determination processing to return to the uniformity output processing shown in FIG. 3. Details of a uniformity determination processing (Step S23) will be described below.

(Uniformity Determination Processing)

Next, the uniformity determination processing (Step S23) will be described with reference to FIGS. 6, 7A, and 7B.

Figure 6:
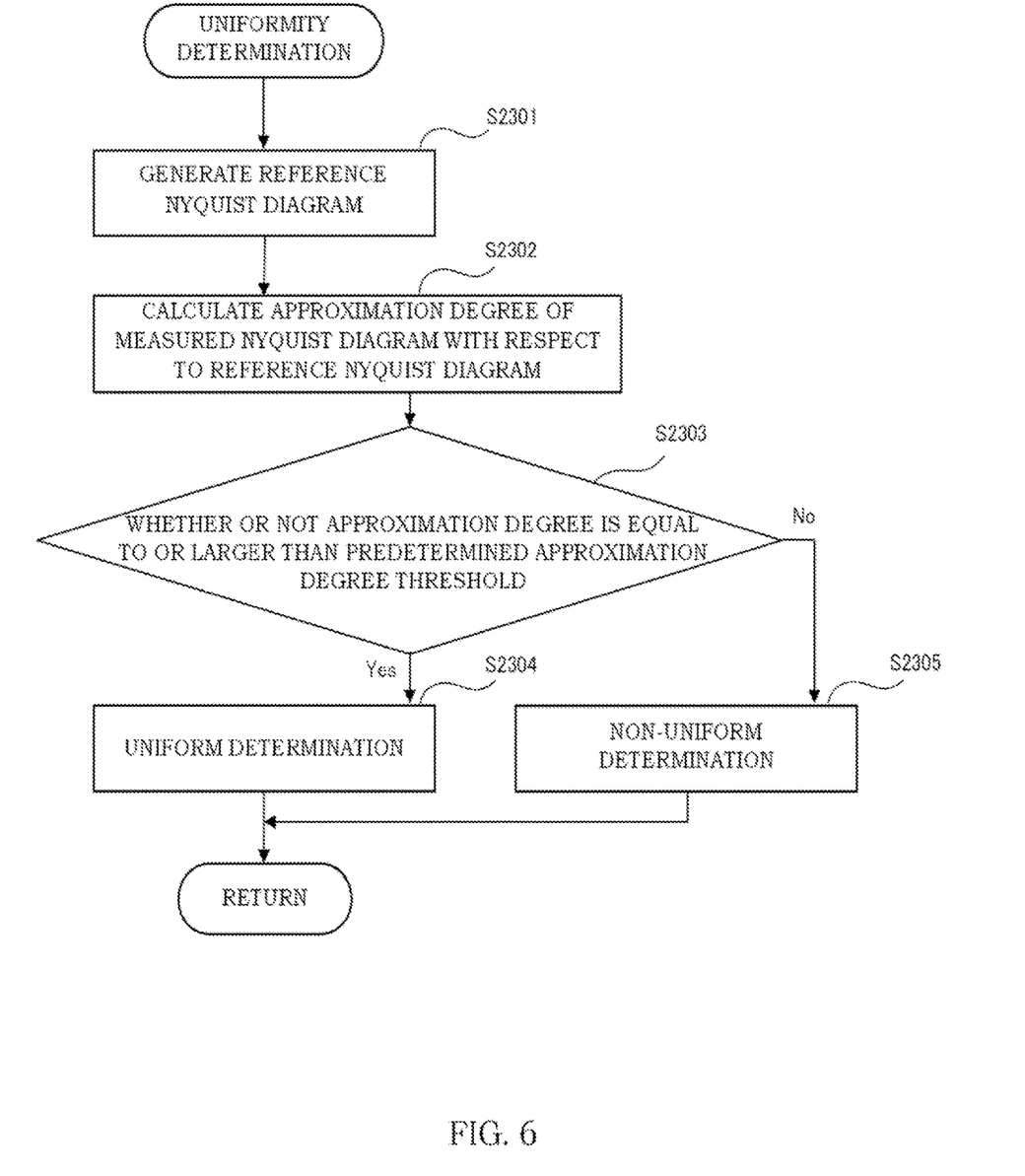
FIG. 6 is a flowchart showing a uniformity determination processing in the diagram-generation/uniformity-determination processing.
Figure 7A:
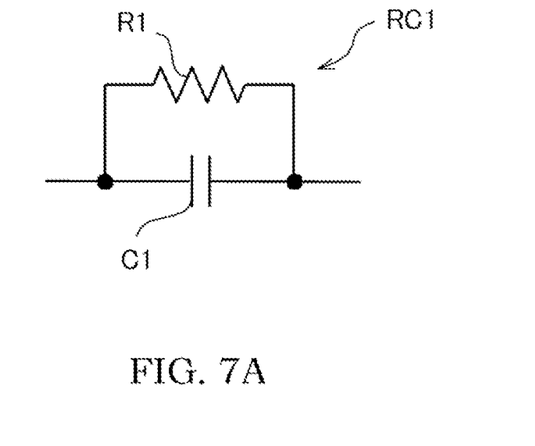
FIG. 7A is an equivalent circuit diagram showing a single parallel circuit that is acquired by execution of a particle equivalent circuit analysis.

FIG. 6 is a flowchart showing the uniformity determination processing (Step S23) in the diagram-generation/uniformity-determination processing (Step S2). FIG. 7A is an equivalent circuit diagram showing the single parallel circuit RC1 that is acquired by the execution of the particle equivalent circuit analysis. FIG. 7B is the complex plane diagram showing the semicircular reference Nyquist diagram M0 corresponding to the parallel circuit RC1 shown in FIG. 7A and the measured Nyquist diagram M shown in FIG. 5. In the above, the reference Nyquist diagram M0 is a semicircle Nyquist diagram having the real number component (R1) of the impedance of the semi-elliptical measured Nyquist diagram M as its diameter.

As shown in FIG. 6, in Step S2301, the uniformity determination module 353 of the processing unit 35 shown in FIG. 2 executes the particle equivalent circuit analysis with the parallel circuit RC1 formed of the resistor R1 and the capacitor C1 (see FIG. 7A) as the element on the basis of the measured Nyquist diagram M output from the Nyquist diagram generating module 352 and generates the semicircular reference Nyquist diagram M0 (see a broken line portion in FIG. 7B) having the real number component (R1) of the impedance of the semi-elliptical measured Nyquist diagram M as its diameter, and then, the processing proceeds to Step S2302. The reference Nyquist diagram M0 is used as an index (parameter) indicating that the particle diameter of the particles in the slurry Xc is perfectly uniform.

Next, in Step S2302, the uniformity determination module 353 determines whether or not the measured Nyquist diagram M approximates the reference Nyquist diagram M0 by using a curve fitting method or a least squares analysis on the basis of the generated reference Nyquist diagram M0 and the measured Nyquist diagram M, and the processing proceeds to Step S2303.

Specifically, in Step S2302, the uniformity determination module 353 calculates, on the basis of the generated reference Nyquist diagram M0 and the measured Nyquist diagram M, an approximation degree of the measured Nyquist diagram M with respect to the reference Nyquist diagram M0 by using the curve fitting method or the least squares analysis.

In the above, a relationship between the above-described approximation degree and the uniformity of the particle diameter of the particles will be described. The inventors have found that, as a result of the intensive researches, the approximation degree is in correlation with the uniformity. In other words, the inventors have found that the higher the approximation degree is, the higher the uniformity, and the lower the approximation degree is, the lower the uniformity. Therefore, the uniformity determination module 353 determines that the higher the calculated approximation degree is, the higher the uniformity. In other words, the uniformity determination module 353 determines that the more the measured Nyquist diagram M approximates the semicircular reference Nyquist diagram M0 having the real number component (R1) of the impedance of that measured Nyquist diagram M as its diameter, the higher the uniformity. As described above, by using the measured Nyquist diagram M and the reference Nyquist diagram M0 corresponding to the single parallel circuit RC1, it is possible to accurately determine the uniformity of the particle diameter of the particles in the slurry Xc in a short period of time.

Next, the determination for high/low uniformity will be described with reference to Steps S2303, S2304, and S2305.

In Step S2303, the uniformity determination module 353 performs the determination, on the basis of the calculated approximation degree, whether or not it is equal to or higher than the predetermined approximation degree threshold that is output from the storage unit 32. In a case in which the calculated approximation degree is equal to or higher than the predetermined approximation degree threshold (in a case of "Yes"), the processing proceeds to Step S2304, and in a case in which the calculated approximation degree is lower than the predetermined approximation degree threshold (in a case of "No"), the processing proceeds to Step S2305. The predetermined approximation degree threshold may also be changed by the operating unit 33 depending on the type of the slurry Xc.

Next, in a case in which it is determined as "Yes" in Step S2303, in Step S2304, the uniformity determination module 353 determines that the particle diameter of the particles in the slurry Xc is uniform and terminates the uniformity determination processing to return to the diagram-generation/uniformity-determination processing (Step S2) shown in FIG. 3.

On the other hand, in a case in which it is determined as "No" in Step S203, in Step S2305, the uniformity determination module 353 determines that the particle diameter of the particles in the slurry Xc is non-uniform and terminates the uniformity determination processing to return to the diagram-generation/uniformity-determination processing (Step S2) shown in FIG. 3.

As described above, it is possible to automatically determine whether or not the particle diameter of the particles in the slurry Xc is uniform by the uniformity determination module 353, in other words, by the processing unit 35.

Next, operational advantages achieved by this embodiment will be described.

The uniformity output device 1 according to this embodiment is the uniformity output device 1 configured to output the uniformity of the particle diameter of the particles in the slurry Xc, in which the insoluble solid matter Xb is mixed in the liquid Xa, and the uniformity output device 1 includes: the electrodes 2 configured to apply the AC voltage to the slurry Xc; the measurement unit 31 configured to determine the impedance of the slurry Xc on the basis of the response current flowing through the slurry Xc when the AC voltage is applied to the slurry Xc while changing the frequency; and the processing unit 35 configured to calculate the uniformity by executing the particle equivalent circuit analysis with the parallel circuit RC1 formed of the resistor R1 and the capacitor C1 as the element on the basis of the impedance measured by the measurement unit 31 in accordance with the frequency.

In addition, a uniformity output method according to this embodiment is the uniformity output method for outputting the uniformity of the particle diameter of the particles in the slurry Xc, in which the insoluble solid matter Xb is mixed in the liquid Xa, and the uniformity output method includes: a step of applying the AC voltage with changing frequency to the slurry Xc; Step S1 for measuring the impedance of the slurry Xc on the basis of the response current flowing through the slurry Xc when the AC voltage with changing frequency is applied to the slurry Xc; and Step S2 for calculating the uniformity by executing the particle equivalent circuit analysis with the parallel circuit RC1 formed of the resistor R1 and the capacitor C1 as the element on the basis of the impedance that is measured in accordance with the frequency.

Furthermore, the program according to this embodiment is the program for causing the computer to execute the output of the uniformity of the particle diameter of the particles in the slurry Xc, in which the insoluble solid matter Xb is mixed in the liquid Xa, and the program causes the processing unit 35 to execute the application of the AC voltage with changing frequency to the slurry Xc; Step S1 for measuring the impedance of the slurry Xc on the basis of the response current flowing through the slurry Xc when the AC voltage with changing frequency is applied to the slurry Xc; and Step S2 for calculating the uniformity by executing the particle equivalent circuit analysis with the parallel circuit RC1 formed of the resistor R1 and the capacitor C1 as the element on the basis of the impedance that is measured in accordance with the frequency.

According to these above-described configurations, the impedance of the slurry Xc on the basis of the response current flowing through the slurry Xc is measured when the AC voltage is applied to the slurry Xc and the uniformity is calculated by executing the particle equivalent circuit analysis with the parallel circuit RC1 formed of the resistor R1 and the capacitor C1 as the element on the basis of the impedance that is measured in accordance with the frequency, and therefore, compared with the sedimentation test that takes a long time and in which the subjectivity of the measurer is involved in the measurement result, it is possible to accurately determine the uniformity of the particle diameter of the particles contained in the slurry Xc in a short period of time.

Figure 7B:
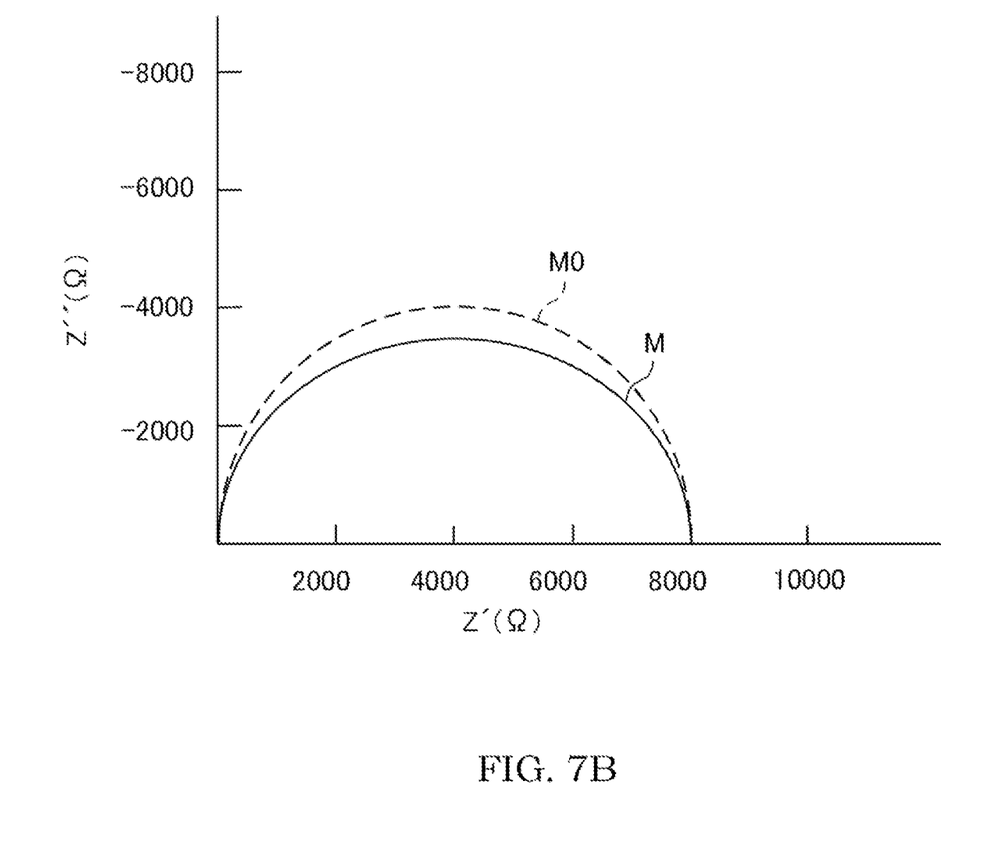
FIG. 7B is a complex plane diagram showing a semicircular reference Nyquist diagram corresponding to the equivalent circuit diagram shown in FIG. 7A and a measured Nyquist diagram shown in FIG. 5.

In addition, in this embodiment, as shown in FIG. 7B, the processing unit 35 determines that the more the measured Nyquist diagram M acquired on the basis of the measured impedance of the slurry Xc approximates the semicircular reference Nyquist diagram M0 that corresponds to the single parallel circuit RC1 acquired by the execution of the particle equivalent circuit analysis, the higher the uniformity.

According to such a configuration, by using the measured Nyquist diagram M and the reference Nyquist diagram M0 corresponding to the single parallel circuit RC1, it is possible to accurately determine the uniformity of the particle diameter of the particles in the slurry Xc in a short period of time.

In addition, in this embodiment, the processing unit 35 determines that the particle diameter of the particles is uniform when the approximation degree of the measured Nyquist diagram M with respect to the reference Nyquist diagram M0 is equal to or larger than the predetermined approximation degree threshold that is set in advance.

According to such a configuration, it is possible to automatically determine whether or not the particle diameter of the particles in the slurry Xc is uniform by the uniformity determination module 353, in other words, the processing unit 35.

Although the present embodiment has been described in the above, the above-mentioned embodiment merely illustrates a part of application examples of the present invention, and the technical scope of the present invention is not intended to be limited to the specific configurations of the above-described embodiment.

(Modification of Uniformity Determination Processing)

Next, a modification of uniformity determination processing (Step S23) will be described with reference to FIGS. 8, 9A, and 9B. In this modification, the description of the configurations that are the same as those in the above-described embodiment is omitted, and the differences with respect to the embodiment described above will be mainly described.

Figure 8:
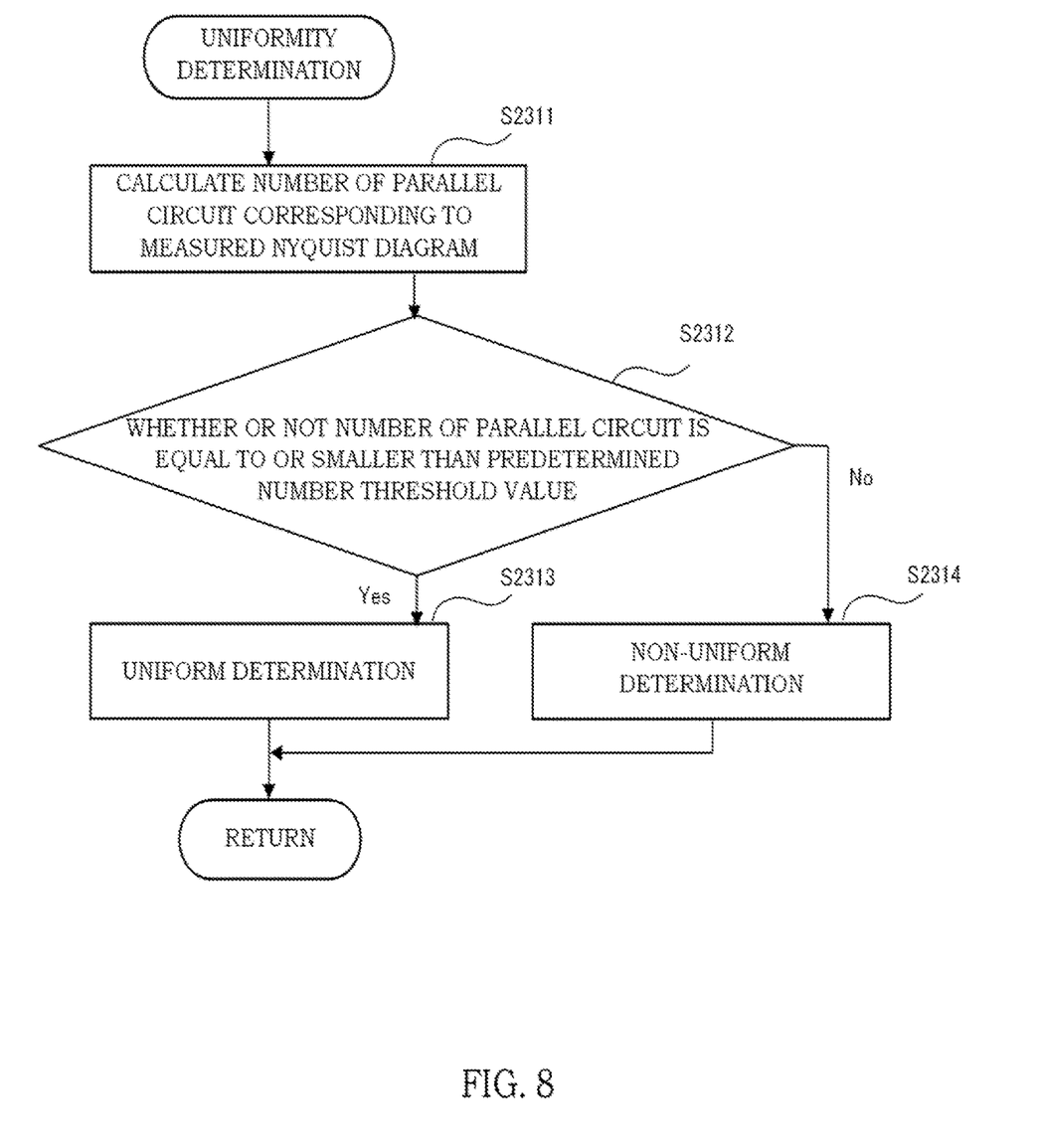
FIG. 8 is a flowchart showing a modification of the uniformity determination processing.
Figure 9A:
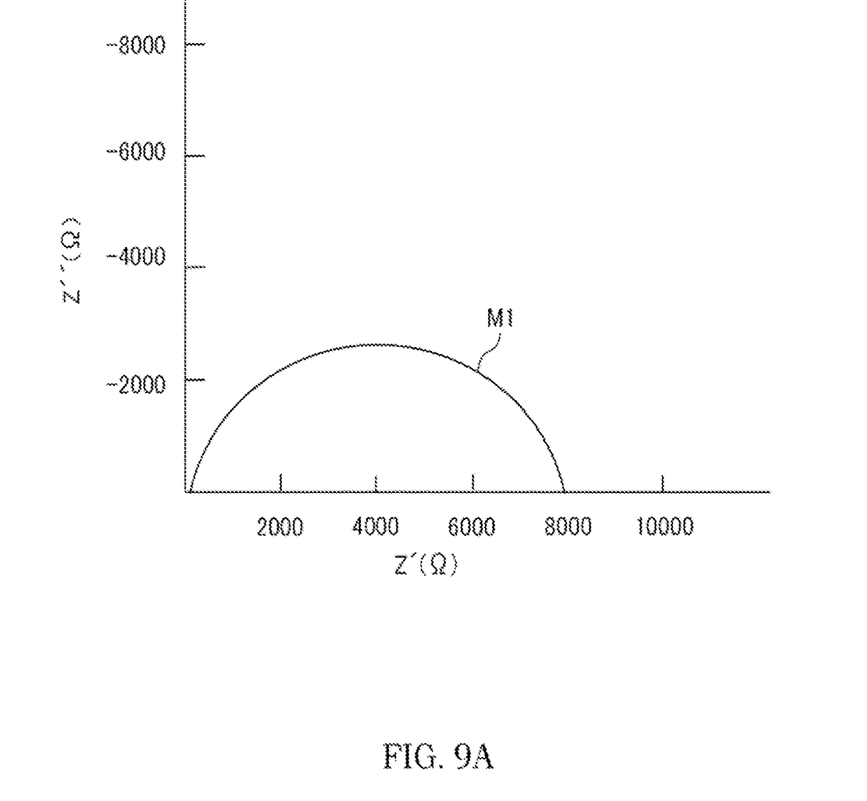
FIG. 9A is a measured Nyquist diagram acquired on the basis of the impedance.
Figure 9B:
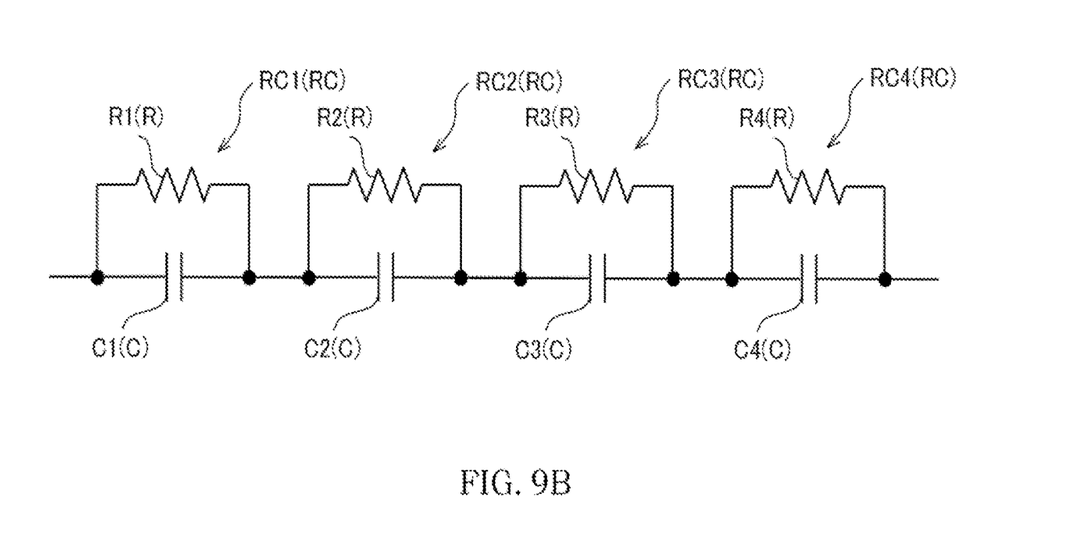
FIG. 9B is the equivalent circuit diagram showing a parallel circuit acquired by executing the particle equivalent circuit analysis corresponding to the measured Nyquist diagram shown in FIG. 9A.

FIG. 8 is a flowchart showing the modification of the uniformity determination processing (Step S23). FIG. 9A is a measured Nyquist diagram M1 that is acquired on the basis of the measured impedance of the slurry Xc. FIG. 9B is the equivalent circuit diagram showing a parallel circuit RC that is acquired by the execution of the particle equivalent circuit analysis corresponding to the measured Nyquist diagram M1 shown in FIG. 9A.

As shown in FIG. 8, in Step S2311, the uniformity determination module 353 of the processing unit 35 calculates the number of the parallel circuits RC (RC1, RC2, RC3, and RC4) (four parallel circuits in the example shown in FIG. 9B) that is acquired by the execution of the particle equivalent circuit analysis corresponding to the measured Nyquist diagram M1 output from the Nyquist diagram generating module 352 (see FIG. 9A), and the processing proceeds to Step S2312.

Here, a relationship between the number of the parallel circuit RC and the uniformity of the particle diameter of the particles will be described. The inventors have found that, as a result of the intensive researches, a reciprocal number of the number of the parallel circuit RC is in correlation with the uniformity. In other words, the larger the number of the parallel circuit RC is, the lower the uniformity, and the smaller the number of the parallel circuit RC is, the higher the uniformity. Therefore, the uniformity determination module 353 determines that the smaller the number of the parallel circuits RC (RC1, RC2, RC3, and RC4) is, the higher the uniformity. As described above, by using the measured Nyquist diagram M1, it is possible to accurately determine the uniformity of the particle diameter of the particles in the slurry Xc in a short period of time.

In a case in which the number of the parallel circuit RC thus calculated is equal to unity, the uniformity determination module 353 determines that the measured Nyquist diagram M1 corresponding to the parallel circuit RC is the semicircle. In other words, the uniformity determination module 353 determines whether or not the measured Nyquist diagram M1 is the semicircle in accordance with the number of the parallel circuit RC. In a case in which the measured Nyquist diagram M1 is the semicircle, the uniformity determination module 353 determines that the particle diameter of the particles in the slurry Xc is the perfectly uniform.

Next, the determination for high/low uniformity will be described with reference to Steps S2312, S2313, and S2314.

In Step S2312, the uniformity determination module 353 performs the determination, on the basis of the number of the parallel circuits RC (RC1, RC2, RC3, and RC4) thus calculated, whether or not it is equal to or lower than a predetermined number threshold value output from the storage unit 32. Then, the processing proceeds to Step S2313 in a case in which the number of the parallel circuits RC (RC1, RC2, RC3, and RC4) thus calculated is equal to or lower than the predetermined number threshold value (in a case of "Yes"), and the processing proceeds to Step S2314 in a case in which the number of the parallel circuits RC (RC1, RC2, RC3, and RC4) thus calculated exceeds the predetermined number threshold value (in a case of "No"). The predetermined number threshold value may also be changed by the operating unit 33 depending on the type of the slurry Xc.

Next, in a case in which it is determined as "Yes" in Step S2312, in Step S2313, the uniformity determination module 353 determines that the particle diameter of the particles in the slurry Xc is uniform and terminates the uniformity determination processing to return to the diagram-generation/uniformity-determination processing (Step S2) shown in FIG. 3.

On the other hand, in a case in which it is determined as "No" in Step S2312, in Step S2314, the uniformity determination module 353 determines that the particle diameter of the particles in the slurry Xc is non-uniform and terminates the uniformity determination processing to return to the diagram-generation/uniformity-determination processing (Step S2) shown in FIG. 3.

As described above, in this embodiment, the uniformity determination module 353 determines whether or not the particle diameter of the particles in the slurry Xc is uniform on the basis of the number of the parallel circuits RC (RC1, RC2, RC3, and RC4) thus calculated. By doing so, it is possible to automatically determine whether or not the particle diameter of the particles in the slurry Xc is uniform by the uniformity determination module 353, in other words, the processing unit 35.

This application claims priority based on Japanese Patent Application No. 2020-009421 filed with the Japan Patent Office on Jan. 23, 2020, the entire contents of which are incorporated into this specification by reference.

EXPLANATION OF REFERENCE 1 uniformity output device
2 electrode 3 uniformity output device main body
31 measurement unit
32 storage unit
33 operating unit
34 display unit
35 processing unit
X tank
Xa liquid
Xb solid matter
Xc slurry

What is claimed is:

1. A uniformity output device configured to output a uniformity of a particle diameter of particles in a mixture in which an insoluble solid matter is mixed in liquid, the uniformity output device comprising:
 an electrode configured to apply an AC signal with a changing frequency to the mixture;
 a measurement unit configured to measure impedance of the mixture based on a response signal flowing through the mixture when the AC signal with the changing frequency is applied to the mixture; and
 a processing unit configured to determine the uniformity by executing an equivalent circuit analysis for particles with a parallel circuit formed of a resistor and a capacitor as an element based on the impedance measured by the measurement unit in accordance with the frequency, wherein the processing unit determines that the more a measured Nyquist diagram acquired based on the impedance approximates a semicircular reference Nyquist diagram corresponding to the parallel circuit acquired by the execution of the equivalent circuit analysis for particles, the higher the uniformity.

2. The uniformity output device according to claim 1, wherein
 the processing unit determines that the particle diameter of the particles is uniform when an approximation degree of the measured Nyquist diagram with respect to the reference Nyquist diagram is equal to or higher than a predetermined approximation degree threshold that is set in advance.

3. The uniformity output device according to claim 1, wherein
 the processing unit determines that the smaller a number of parallel circuits comprising the parallel circuit that is acquired by the execution of the equivalent circuit analysis corresponding to the measured Nyquist diagram acquired based on the impedance is, the higher the uniformity.

4. The uniformity output device according to claim 3, wherein
 the processing unit determines that the particle diameter of the particles is uniform when the number of the parallel circuits is equal to or smaller than a predetermined number threshold value that is set in advance.

5. The uniformity output device according to claim 1, wherein the parallel circuit is a single parallel circuit.

6. A uniformity output method configured to output a uniformity of a particle diameter of particles in a mixture in which an insoluble solid matter is mixed in liquid, the uniformity output method comprising:
 applying an AC signal with changing frequency to the mixture;
 measuring impedance of the mixture based on a response signal flowing through the mixture when the AC signal with changing frequency is applied to the mixture; and
 determining the uniformity by executing an equivalent circuit analysis for particles with a parallel circuit formed of a resistor and a capacitor as an element based on the impedance measured in accordance with the frequency, wherein the determining includes determining that the more a measured Nyquist diagram acquired based on the impedance approximates a semicircular reference Nyquist diagram corresponding to the parallel circuit acquired by the execution of the equivalent circuit analysis for particles, the higher the uniformity.

7. The uniformity output method of claim 6, wherein the parallel circuit is a single parallel circuit.

8. A non-transitory computer-readable recording medium including a program configured to cause a computer to output a uniformity of a particle diameter of particles in a mixture in which an insoluble solid matter is mixed in liquid, the program causing the computer to:
 apply an AC signal with changing frequency to the mixture;
 measure impedance of the mixture based on a response signal flowing through the mixture when the AC signal with changing frequency is applied to the mixture; and
 determine the uniformity based on a reference Nyquist diagram by executing an equivalent circuit analysis for particles with a parallel circuit formed of a resistor and a capacitor as an element based on the impedance measured in accordance with the frequency, wherein to determine the uniformity, the program causes the computer to determine that the more a measured Nyquist diagram acquired based on the impedance approximates a semicircular reference Nyquist diagram corresponding to the parallel circuit acquired by the execution of the equivalent circuit analysis for particles, the higher the uniformity.

9. The non-transitory computer-readable recording medium of claim 8, wherein the parallel circuit is a single parallel circuit.

* * * * *